United States Patent
Tsukamoto (10) Patent No.: US 8,633,943 B2
(45) Date of Patent: Jan. 21, 2014

(54) IMAGE DISPLAY APPARATUS, IMAGE DISPLAY METHOD, AND PROGRAM STORAGE MEDIUM FOR ARRANGING AND DISPLAYING IMAGES OF A PLURALITY OF TONES

(75) Inventor: Akihiro Tsukamoto, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 211 days.

(21) Appl. No.: 13/109,387

(22) Filed: May 17, 2011

(65) Prior Publication Data

US 2011/0285739 A1　Nov. 24, 2011

(30) Foreign Application Priority Data

May 18, 2010　(JP) .................................. 2010-114630

(51) Int. Cl.
*G09G 5/00* (2006.01)
(52) U.S. Cl.
USPC .......................................................... 345/619
(58) Field of Classification Search
None
See application file for complete search history.

(56) References Cited

U.S. PATENT DOCUMENTS

| | | | | |
|---|---|---|---|---|
| 2001/0006425 | A1* | 7/2001 | Takamori et al. | 358/530 |
| 2005/0174589 | A1* | 8/2005 | Tokiwa | 358/1.9 |
| 2007/0157102 | A1* | 7/2007 | Hasegawa et al. | 715/769 |
| 2008/0309644 | A1* | 12/2008 | Arimoto | 345/173 |
| 2008/0316518 | A1* | 12/2008 | Watari et al. | 358/1.13 |
| 2009/0319897 | A1* | 12/2009 | Kotler et al. | 715/711 |

FOREIGN PATENT DOCUMENTS

| | | |
|---|---|---|
| JP | 8-44867 A | 2/1996 |
| JP | 11-187351 A | 7/1999 |
| JP | 2004-213598 A | 7/2004 |
| JP | 2004-215287 A | 7/2004 |
| JP | 2009-141678 A | 6/2009 |

* cited by examiner

*Primary Examiner* — Aaron M Richer
*Assistant Examiner* — Mohammad H Akhavannik
(74) *Attorney, Agent, or Firm* — Holtz, Holtz, Goodman & Chick, PC (57) ABSTRACT

An image display apparatus includes a storage unit configured to store first images, a processor configured to change tones of first reduced images of the first images to first tones, and a display configured to display the first reduced images of the first images in a column direction or a row direction, and to display tone-changed reduced images of the first images in the row direction or the column direction.

6 Claims, 8 Drawing Sheets

IMAGE DISPLAY APPARATUS, IMAGE DISPLAY METHOD, AND PROGRAM STORAGE MEDIUM FOR ARRANGING AND DISPLAYING IMAGES OF A PLURALITY OF TONES

CROSS-REFERENCE TO RELATED APPLICATIONS

This application is based upon and claims the benefit of priority from prior Japanese Patent Application No. 2010-114630, filed May 18, 2010, the entire contents of which are incorporated herein by reference.

BACKGROUND OF THE INVENTION

1. Field of the Invention

The present invention relates generally to an image display apparatus and image display method for changing a tone of an image, and a program storage medium.

2. Description of the Related Art

In recent years, digital cameras are widely available, and digital photographs are usually saved as digital image data. When a conventional film camera is used to take a photograph, the photograph is often printed. In a case of digital image, however, a user can use a digital camera to take a digital photograph. The images can be viewed on a digital camera or image data can be loaded to a personal computer and images can be viewed on the personal computer. Therefore, this offers the user variety of ways to enjoy the photographs.

In the above circumstances, in order to allow users to enjoy image data in the same manner as they enjoy conventional print, so-called digital photo frames are realized and widely available (for example, Jpn. Pat. Appln. KOKAI Publication No, 2009-141678).

The digital photo frame makes use of features of digital method to achieve various kinds of display modes, e.g., displaying a plurality of photographs as a slide show, which cannot be achieved by a conventional photo frame for displaying a print, and further, for example, Jpn. Pat. Appln. KOKAI Publication No. 8-44867 suggests a video correction apparatus capable of applying image processing so as to generate and display, for example, an image having a different tone but still based on an original photograph (for example, a final video which appears similar to an artwork).

This allows a user to enjoy digital images as if they are not simply photographs but are paintings. However, in the technique described in Jpn. Pat. Appln. KOKAI Publication No. 8-44867, simulation is performed in units of pixels, which is insufficient in enhancing artistic quality in view of the entire image.

For this reason, Jpn. Pat. Appln. KOKAI Publication No. 2004-213598 suggests a technique for extracting features such as color information and brush touch information from an image of a painting that is actually painted by an artist and converting a taken image into a highly artistic painting-like image in view of the entire original image by applying the extracted features to the image.

Therefore, as image processing for obtaining a highly-artistic image from an original image, an image processing for generating image data so as to further enhance the artistic presentation effect in view of the entire original image can be achieved.

However, although a conventional image processing technique includes changing a tone of an image to many tones such as an oil painting, a water color painting, a pastel painting, and the like, a CPU is required to perform a large amount of arithmetic operations so as to apply the above processing, and it takes a long time to change a tone of an image.

When it takes a long time to perform conversion processing, it is difficult to try various kinds of conversion processing and select a most suitable painting tone image.

BRIEF SUMMARY OF THE INVENTION

An object of the present invention is to provide an image display apparatus and an image display method capable of allowing a user to quickly understand an atmosphere of tone-changed images of a plurality of tones.

Another object of the present invention is to provide an image display apparatus and an image display method capable of allowing a user to quickly select a converted image of a desired tone.

Still another object of the present invention is to provide an image display apparatus and an image display method allowing an image in a predetermined display format to be reproduced by another image display apparatus via a storing medium.

According to an embodiment of the present invention, an image display apparatus comprises:

a storage unit configured to store first images;

a processor configured to change tones of first reduced images of the first images to first tones; and a display configured to display the first reduced images of the first images in a column direction or a row direction, and to display tone-changed reduced images of the first images in the row direction or the column direction.

According to another embodiment of the present invention, an image display method comprises:

displaying first reduced images of first images in a column direction or a row direction; and displaying tone-changed reduced images of the first images in the row direction or the column direction.

According to another embodiment of the present invention, a non-transitory computer-readable storage medium has stored thereon a computer program which is executable by a computer, the computer program comprises instructions capable of causing the computer to execute functions of:

displaying first reduced images of first images in a column direction or a row direction; and displaying tone-changed reduced images of the first images in the row direction or the column direction.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the present invention and, together with the general description given above and the detailed description of the embodiments given below, serve to explain the principles of the present invention.

DETAILED DESCRIPTION OF THE INVENTION

Figure 1A:
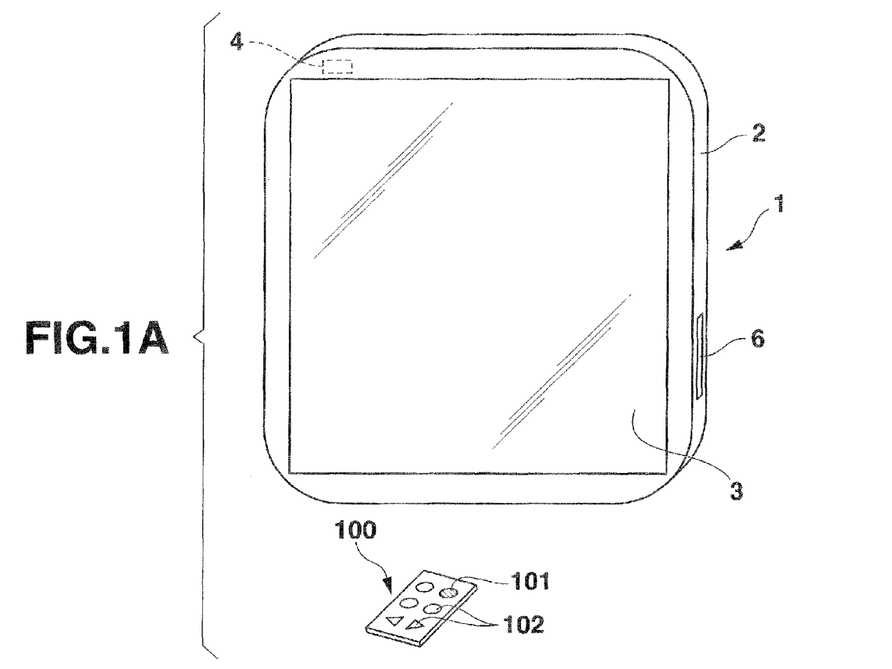
FIG. 1A is a perspective view illustrating an external appearance of an image display apparatus according to an embodiment of the present invention.
Figure 1B:
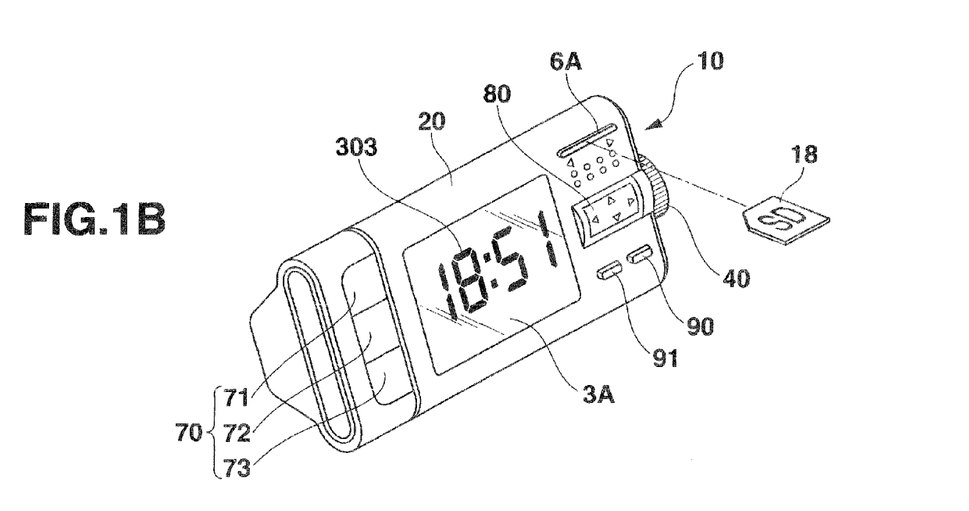
FIG. 1B is a perspective view illustrating an external appearance of an image display clock according to an embodiment of the present invention.

An embodiment of the present invention will be hereinafter explained. An external appearance of the embodiment may be in various forms as shown in FIGS. 1A and 1B, for example. FIG. 1A is a perspective view illustrating a digital photo frame 1 serving as an embodiment of an image display apparatus according to the present invention, and also illustrating a remote controller 100 with which the digital photo frame 1 is operated. On a front surface of a thin plate-shaped digital photo frame 1, a display unit includes a liquid crystal display panel 3 mounted on a main body 2. On an upper portion of the front surface of the main body 2, an infrared signal receiver 4 is provided to receive an infrared signal transmitted from the remote controller 100, and on a side surface, a memory card slot 6 is provided. The remote controller 100 has a power switch 101 and a plurality of operation switches 102.

FIG. 1B is a perspective view illustrating a desk clock 10 as another embodiment of an image display apparatus according to the present invention. The main body 20 includes a card slot 6A and a liquid crystal display panel 3A. The display panel 3A displays a time indication 303 in a normal state. An electric configuration of the desk clock 10 is substantially the same as the digital photo frame 1, and description thereof is omitted. The desk clock 10 includes a function of a wave clock, with which the time indication 303 is maintained at a correct time. For example, a dial 40 is used to adjust the time of the clock. Mode keys 70 include a clock mode key 71, a normal mode (photo frame mode) 72, and a key 73 for specifying an effect mode. A cursor key 80 is used to specify up, down, right, and left in a screen. An all-change key 90 to change tones of all images displayed in the effect mode and an enter key 91 are also provided.

Figure 2:
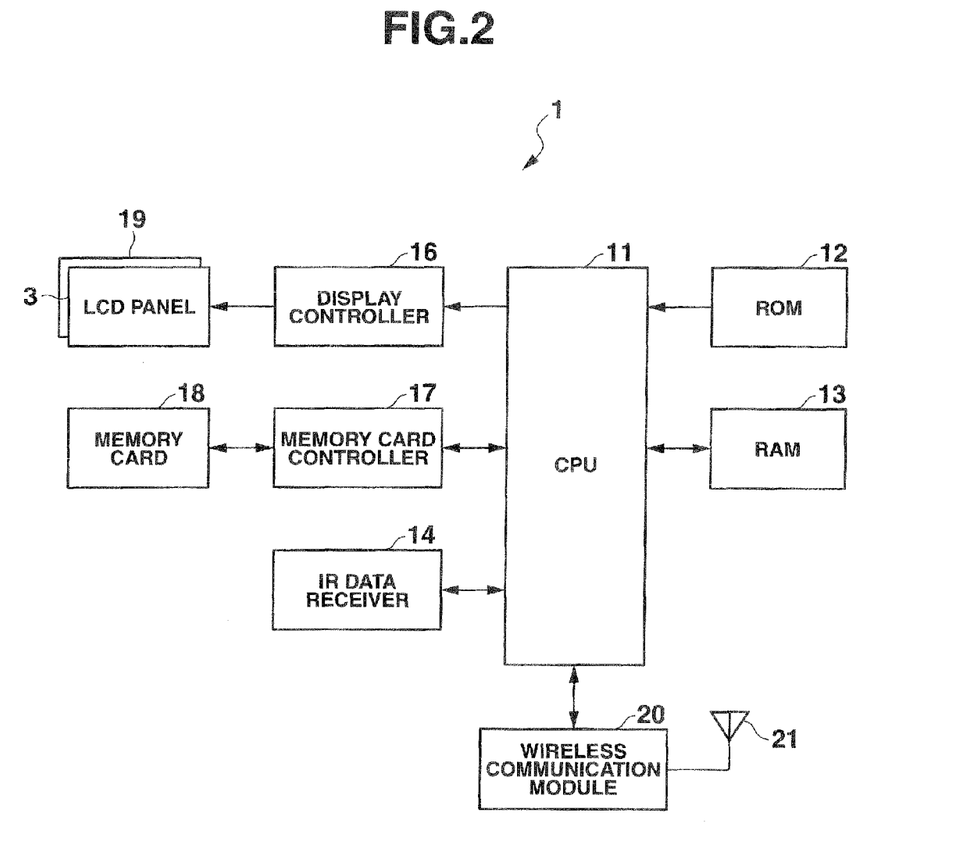
FIG. 2 is a block diagram illustrating a circuit configuration of the image display apparatus.

FIG. 2 is a block diagram illustrating an electric configuration of the digital photo frame 1. The digital photo frame 1 includes a CPU (Central Processing Unit) 11, a ROM (Read Only Memory) 12 connected to the CPU 1, a RAM (Random Access memory) 13, an Infrared (Ir) data receiver 14 including the infrared signal receiver 4, a display controller 16, a memory card controller 17, a touch panel 19, and a wireless communication module 20.

The ROM 12 stores a program for causing the CPU 11 to perform operation as shown in a flowchart explained later. The ROM 12 stores a program for snapshot-to-painting conversion. In this specification, the term "snapshot-to-painting conversion" means a conversion from a photograph to a painting-like artwork by changing a tone of an original image. For example, this program performs tone changing processing on a taken photograph by applying features such as color information and brush touch information extracted from 12 styles of artwork: oil painting, thick oil painting, gothic oil painting, fauvist oil paining, water color painting, gouache painting, pastel painting, color pencil sketch, pointillism, silkscreen, drawing, and air brush, which are drawn/painted by a real artist, and thus generates a painting tone image.

The snapshot-to-painting conversion is an image processing technique for changing a tone of each pixel forming an image such as a photograph in accordance with a predetermined parameter (snapshot-to-painting conversion parameter), thereby converting the photograph into a painting-like artwork such as the above 12 style paintings.

Basically, the image is converted so that the image appears to have a painting tone, by adjusting and combining parameters of various kinds of effect processing known in photo retouch software and the like.

Examples of effect processing include texture processing for mapping texture to an image to give a special texture thereto; resolution processing for dividing an image into a contour portion, a texture portion such as precise patterns, and a flat portion, appropriately applying processing thereto, and enhancing texture and feeling of resolution; HSV processing for dividing and adjusting colors into three elements, i.e., hue, saturation, value; RGB processing for adjusting the intensity of respective colors, i.e., R (red), G (green), B (blue), of an image; RGB replacing processing for replacing colors R, G, and B to colors G, B, and R; edge extraction processing for applying a filter called Laplacian filter; middle density extraction processing for applying a filter called median filter; density extraction processing for extracting R, G, and B histograms of adjacent pixels and performing processing for minimum, medium, and maximum density levels; equalizing processing for adopting the darkest portion of an image as black and adopting the brightest portion as white, makes a histogram therebetween as an appropriate distribution, and correcting contrast and extending the histogram of the image; gamma correction processing for adjusting intermediate brightness while maintaining bright portions and dark portions; shadow processing for increasing brightness in the dark portion of an image and decreasing brightness in the bright portion; solarization processing for inverting R, G, and B values when the R, G, and B values of each pixel have a brightness equal to or more than a threshold value; and noise adding processing for drawing random dots, generating noises, and adjusting the amount of noises and colors.

Further, there is also effect processing for applying tone mapping to a picture having a wide dynamic range called HDR (High Dynamic Range) that cannot be expressed by an ordinary photograph, so that the image is put into a narrow dynamic range, whereby expressiveness is enhanced by correcting an extreme white caused by overexposure and a black suppression caused by underexposure.

In other words, the snapshot-to-painting conversion processing is one of effect processing in principle. In the snapshot-to-painting conversion algorithm, various kinds of painting tones are generated by a combination of effect processing and parameters, and the conversion algorithm is programmed.

In the conversion algorithm, a parameter group P, i.e., a set (combination) of the parameters for changing a tone of pixels in an original image, is prepared in advance. When there are twelve kinds of painting tones, they are denoted with parameter groups P1 to P12. A tone of a converted painting-like image is changed according to how the parameters are determined. The parameter group for changing a tone of an image to an oil painting is denoted with P1. When the parameter group P1 includes m parameters needed for effect processing for changing a tone of an image to an oil painting, the m parameters of the parameter group P1 are denoted with parameters $P1_1$ to $P1_m$.

In general, a pixel is represented by a level having a plurality of bits in each of R, G, and B. A parameter is an element for applying arithmetic operation on bit data. For example, the following operation is performed to emphasize red component and slightly reduce green component and blue component, R×2, G×0.9, B×0.5. In this case, "2", "0.9", "0.5" are parameters.

Alternatively, for example, arithmetic elements are programmed in advance, and the following operations are assumed to be performed. When the degree of emphasis of red is 1, R×1.1 is calculated. When the degree of emphasis thereof is 2, R×1.2 is calculated. When the degree of emphasis thereof is 3, R×1.3 is calculated. In this case, the above degrees of emphasis are also parameters.

Still alternatively, predetermined operation may be performed between a pixel in question and a pixel adjacent thereto. For example, it is assumed that the following pixels are arranged above, below, and at the right and left of a pixel A5(R,G,B): pixels A1(R,G,B), A2(R,G,B), A3(R,G,B), A4(R,G,B), A5(R,G,B), A6(R,G,B), A7(R,G,B), A8(R,G,B), A9(R,G,B). In this case, the following operation is performed with respect to the A5(R):

A5(R)=A1(R)×q1+A2(R)×q2+A3(R)×q3+A4(R)×q4+A5(R)×q5+A6(R)×q6+A7(R)×q7+A8(R)×q8+A9(R)×q9.

Likewise, the same operations are also performed with respect to G and B. In this case, q is a parameter, and different effect processing can be performed by changing this numerical value.

There is also another effect processing for processing an image into an image having a different touch (hereinafter referred to as "brush touch").

More specifically, highly correlated pixels are collected from pixels forming image data based on a reference such as color, thereby forming a group. Subsequently, for pixels in respective groups, colors of pixels in the same group are replaced with a representing color of the group. Each brush touch is formed by the group of pixels whose colors are thus replaced with the representing color. In the above image processing, the brush touch of the formed image can be changed by changing the correlation of pixels collected as a group and the shape (length (distance) and oblateness) of a group comprising pixels of the same color (representing color), and as a result, the tone of the image represented by the image data can be changed to various kinds of painting tones. Further, for each of the various kinds of tones, an appropriate combination of parameters such as a length and an oblateness representing the shape of the group and the degree of collation used in each processing are defined.

Each of the plurality of pieces of image data can be changed into different brush touches by adjusting the shape of the group in which pixels constituting a brush touch are collected, e.g., the oblateness of the group, when the tone is changed. When the oblateness of the group comprising pixels having the same color representing the brush color is increased, the brush touch becomes thicker, and as a result, the image is displayed in such a manner that the touch of the image is rough. When the oblateness of the group comprising pixels having the same color is decreased, a small brush touch can be made, and as a result, the image is displayed with a fine touch of the image.

The RAM 13 is a work memory in which the CPU 11 temporarily stores various kinds of data as necessary. The Ir data receiver 14 demodulates an infrared signal which the infrared signal receiver 4 receives from the remote controller 100, and provides an instruction content to the CPU 11 in accordance with key operation performed with the remote controller 100.

The display controller 16 drives the liquid crystal display panel 3 based on display image data provided by the CPU 11, so that images represented by the image data are displayed on the liquid crystal display panel 3. The memory card controller 17 is an input/output interface for controlling input/output of data between various kinds of memory cards 18 detachably attached to the memory card slot 6 and the CPU 11 connected thereto. The touch panel 19 is formed on the liquid crystal display panel 3 to detect a position touched by a hand or a finger of a user on the liquid crystal display panel 3. Examples of touch input methods may be various kinds of methods including an optical method, a capacitive method. However, the touch input method is not limited to any particular method, and the position detection may be achieved by allowing a user to select an item with a cursor.

The wireless communication module 20 is connected to an antenna 21, and performs communication processing including terminal authentication processing and data processing in accordance with communication protocol.

Operation modes of the image display apparatus 1 include a normal mode and an effect mode. A user can switch the operation mode by manipulating the operation switch 102 according to a predetermined procedure.

In the normal mode, images stored as image data in the memory card 18 are displayed on the liquid crystal display panel 3 as they are like a generally-available digital photo frame (DPF).

An example of an image that can be displayed on the image display apparatus 1 is a picture taken by a digital camera, which is compressed by JPEG (Joint Photographic Expert Group) method and stored as a still picture file together with additional information such as a shooting date/time. It is to be understood that the image display apparatus 1 can also support various image formats such as RAW, BMP, and PNG. The image source does not have to be a picture n image taken by a digital camera.

In the effect mode, a tone of an image in question stored in the memory card 18 is changed to a painting tone having a feature of a painting, i.e., a painting tone to which a particular effect is applied, and the tone-changed image is displayed on the liquid crystal display panel 3.

In the effect mode, it is possible to select a type of a target tone when an image is converted to a painting tone image, i.e., it is possible to select a feature (tone) of a converted painting image. In the present embodiment, examples of selectable tones include an oil painting, a thick oil painting, a gothic oil painting, a fauvist oil paining, a water color painting, a gouache painting, a pastel painting, a color pencil sketch, a pointillism, a silkscreen, a drawing, and an air brush. However, examples of selectable tones are not limited to the above. In addition, it may be possible to allow selection of conversions incorporating features of artists such as Gogh-like tone, Monet-like tone, and Picasso-like tone. Algorithms for other tones may be provided in the memory card 18.

In each embodiment herein, a program for conversion into 12 types of tones ranging from an oil painting to an air brush is stored. An order of precedence for selection is as follows: (1) an oil painting, (2) a thick oil painting, (3) a gothic oil painting, (4) a fauvist oil paining, (5) a water color painting, (6) a gouache painting, (7) a pastel painting, (8) a color pencil sketch, (9) a pointillism, (10) a silkscreen, (11) a drawing, and (12) an air brush.

Figure 3A:
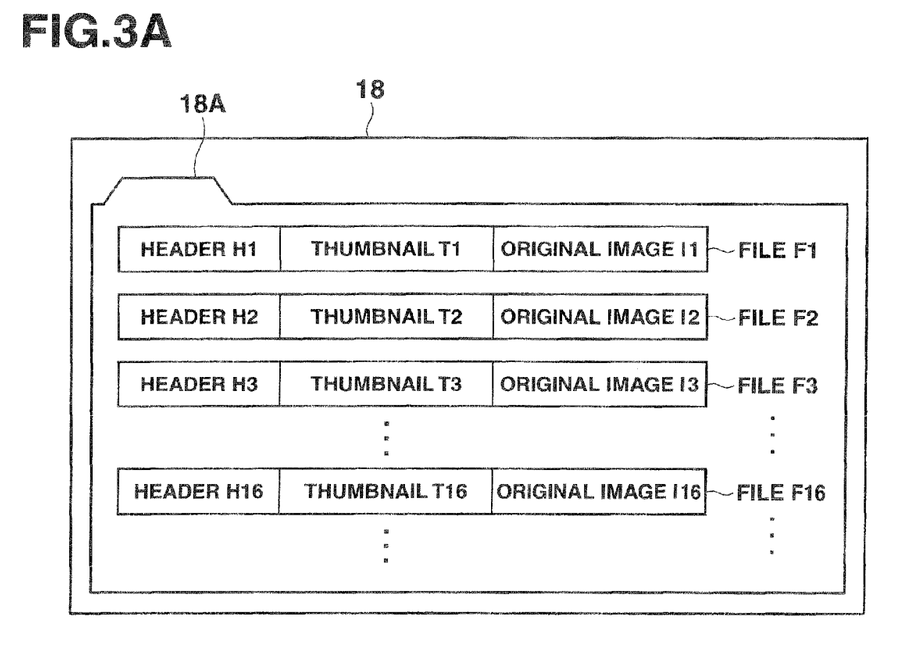
FIG. 3A is a diagram illustrating a storage state of a folder 18A of a memory card.
Figure 3B:
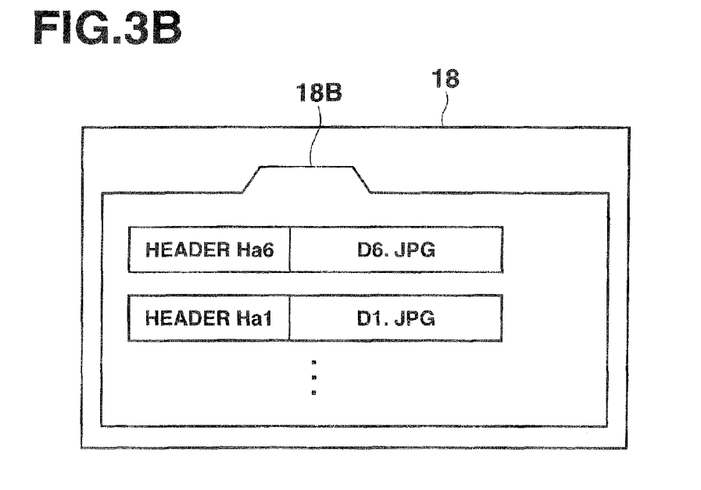
FIG. 3B is a diagram illustrating a storage state of a folder 18B of the memory card.

FIGS. 3A and 3B show a memory configuration diagram illustrating contents stored in the memory card 18. The memory card 18 is detachably attached to the digital camera. A folder 18A shown in FIG. 3A and a folder 18B shown in FIG. 3B are formed in the memory card 18. In the folder 18A, many images are generated as JPEG files as pictures are taken with the digital camera. These files are recorded as image files F1, F2, F3, . . . . The image files F1, F2, F3 . . . include headers H1, H2, H3, . . . having data such as EXIF (Exchangeable Image File Format), image data obtained by taking pictures and serving as original images I1, I2, I3, . . . , and thumbnail image data, i.e., reduced images of the original images (thumbnails T1, T2, T3, . . . ). Since the size of a reduced image displayed on a screen is different according to the size of the display screen, preview images for display may be generated and stored separately from the thumbnails. In the present embodiment, thumbnails as well as preview images are collectively referred to as thumbnails.

In other words, these image files F1, F2, F3, . . . have a file format used in a generally-available digital camera. Therefore, the image display apparatus 1 can be used by simply plugging the SD card (memory card 18) including pictures taken by the digital camera into the memory card slot 6.

In the folder 18B, image data including tone-changed thumbnails are compressed in processing explained later in accordance with JPEG method, i.e., a general-purpose file format, and still picture files as well as additional information such as a conversion date/time are stored.

Specific operations performed by the image display apparatus 1 in the effect mode of the present embodiment will be hereinafter explained.

Figure 4:
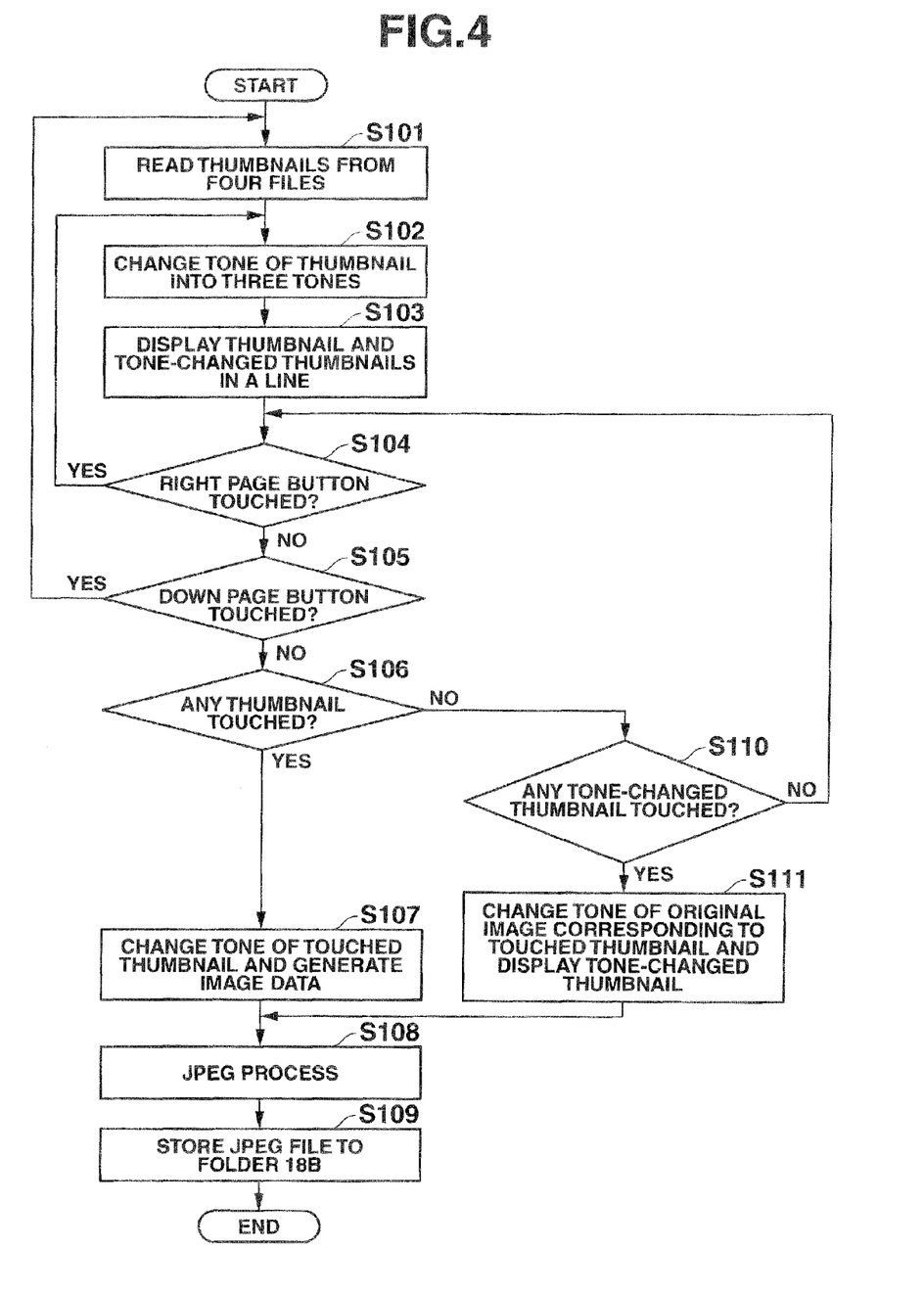
FIG. 4 is a flowchart illustrating processing procedure performed by an image display apparatus according to the embodiment of the present invention.

FIG. 4 is a flowchart illustrating processing procedure performed by the CPU 11 when the effect mode is set in the present embodiment. When the effect mode is set, the CPU 11 executes processing as shown in this flowchart in accordance with the program stored in the ROM 12.

First, the CPU 11 reads, from the folder 18A of the memory card 18, thumbnails in four image files to be displayed (step S101). Then, tone changing processing is performed so that a tone of each of the thumbnails for four pictures thus read is changed to three types of tones (step S102). In other words, the order of precedence is as follows: (1) an oil painting, (2) a thick oil painting, and (3) a gothic oil painting. Accordingly, tone changing processing is performed so that a tone of each of the four thumbnails is changed to an oil painting, a thick oil painting, and a gothic oil painting. Therefore, at this occasion, if thumbnails T1 to T4 are read from the files F1 to F4 in step S101, tone changing processing is performed so that a tone of each of the thumbnails T1 to T4 is changed to an oil painting, a thick oil painting, and a gothic oil painting.

Figure 5A:
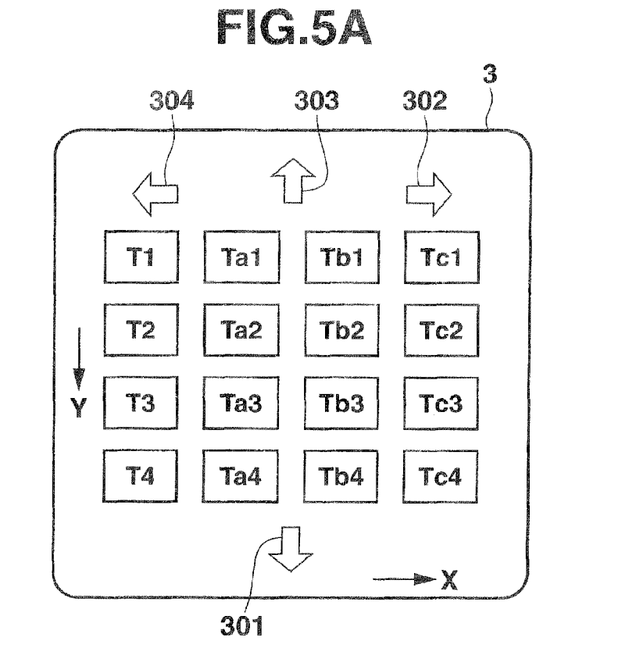
FIGS. 5A, 5B, and 5C are transition diagrams according to the embodiment.

Subsequently, totally four images, i.e., an original thumbnail T and three tone-changed thumbnails Ta, Tb, and Tc, are displayed on the liquid crystal display panel 3 in a line (row direction) (step S103). Therefore, when the thumbnails T1 to T4 are read, and the tone changing processing is performed so that a tone of each of the thumbnails T1 to T4 is changed to an oil painting, a thick oil painting, and a gothic oil painting, the liquid crystal display panel 3 attains a display state as shown in FIG. 5A as a result of the processing in step S103.

In other words, in the liquid crystal display panel 3, the thumbnails T1 to T4 are displayed in a column direction at the left end. In addition, for example, tone-changed thumbnails generated from the thumbnail T1, i.e., an oil painting thumbnail Ta1, a thick oil painting thumbnail Tb1, and a gothic oil painting thumbnail Tc1, are displayed with respect to the original thumbnail T1 in a row direction. The other thumbnails T2, T3, and T4 are displayed in the same manner. More specifically, tone-changed thumbnails generated from the thumbnails T2, T3, and T4, i.e., the oil painting thumbnails Ta2, Ta3, and Ta4, thick oil painting thumbnails Tb2, Tb3, and Tb4, and gothic oil painting thumbnails Tc2, Tc3, and Tc4, are displayed with respect to the original thumbnails T2, T3, and T4 in a row direction.

At this occasion, the CPU 11 displays a downward page turn button 301, a right page turn button 302, an upward page turn button 303, and a left page turn button 304 on the liquid crystal display panel 3.

In the present embodiment, X direction is referred to as row direction, and Y direction is referred to as column direction in a plane coordinate.

In this state, a page can be turned downward (Y direction) by performing touch slide operation with a finger or with the downward page turn button 301, or a page can be turned to the right (X direction) by performing touch slide operation with a finger or with the right page turn button 302. The page can be turned downward or to the right by several lines not by a unit of page or can be scrolled downward or to the right with a constant speed.

In other words, in step S104 subsequent to step S103, it is determined whether the right page turn button 302 is touched or not. When the right page turn button 302 is not touched, it is determined whether the downward page turn button 301 is touched or not (step S105). When it is determined that the downward page turn button 301 is touched, step S101 is subsequently performed.

When a page is turned downward (step S105; YES), a thumbnail of a subsequent image is displayed. In other words, the flowchart of FIG. 4 is repeated, and the CPU 11 reads, from the folder 18A of the memory card 18, thumbnails in four image files to be displayed (step S101). At this occasion, when the thumbnails T1 to T4 are read from the files F1 to F4 in previous processing, thumbnails T5 to T8 are read from files F5 to F8 in this processing. Then, tone changing processing is performed so that a tone of each of these thumbnails T5 to T8 is changed to an oil painting, a thick oil painting, and a gothic oil painting (step S102), and the tone-changed thumbnails are displayed (step S103).

Figure 5B:
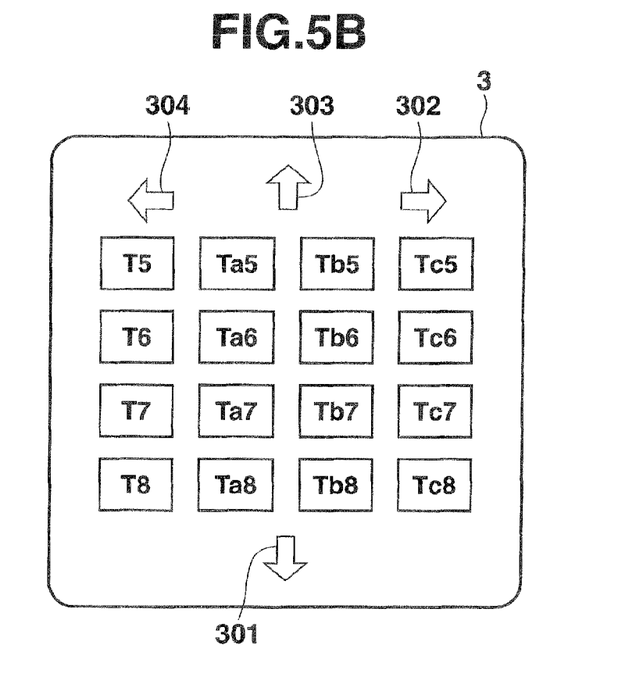

Accordingly, the state of the liquid crystal display panel 3 changes from the state of FIG. 5A to the state of FIG. 5B. In this state, the thumbnails T5 to T8 are displayed in a column direction at the left end. In addition, for example, tone-changed thumbnails generated from the thumbnail T5, i.e., an oil painting thumbnail Ta5, a thick oil painting thumbnail Tb5, and a gothic oil painting thumbnail Tc5, are displayed with respect to the original thumbnail T5 in a line (row direction). The other thumbnails T6, T7, and T8 are displayed in the same manner. More specifically, tone-changed thumbnails generated from the original thumbnails T6, T7, and T8, i.e., oil painting thumbnails Ta6, Ta7, Ta8, thick oil painting thumbnails Tb6, Tb7, Tb8, and gothic oil painting thumbnails Ta8, Ta8, Ta8, are displayed with respect to the original thumbnails T6, T7, T8 in a row direction.

Therefore, a user can quickly view a desired tone-changed image, and furthermore, the user can easily select which original image is changed to which tone.

When a page is turned to the right (step S104; YES), a different kind of tone changing is applied to the same thumbnail.

In other words, the CPU 11 returns from step S104 to step S102, so that tone changing processing is performed so that each of the thumbnails for four pictures already read is changed to following three types of tones. In other words, the order of precedence is as follows: (4) a fauvist oil paining, (5) a water color painting, and (6) a gouache painting. Accordingly, tone changing processing is performed so that a tone of each of the four thumbnails is changed to a fauvist oil paining, a water color painting, and a gouache painting. Therefore, at this occasion, if thumbnails T1 to T4 are read from the files F1 to F4 in step S101, tone changing processing is performed so that each of the thumbnails T1 to T4 is changed to a fauvist oil paining, a water color painting, end a gouache painting.

Figure 6A:
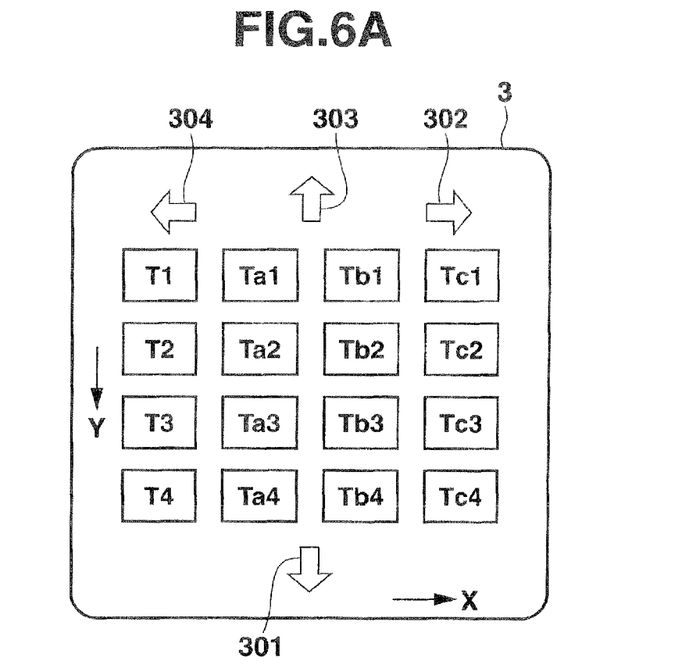
FIGS. 6A, 6B, and 6C are other transition diagrams according to the embodiment.
Figure 6B:
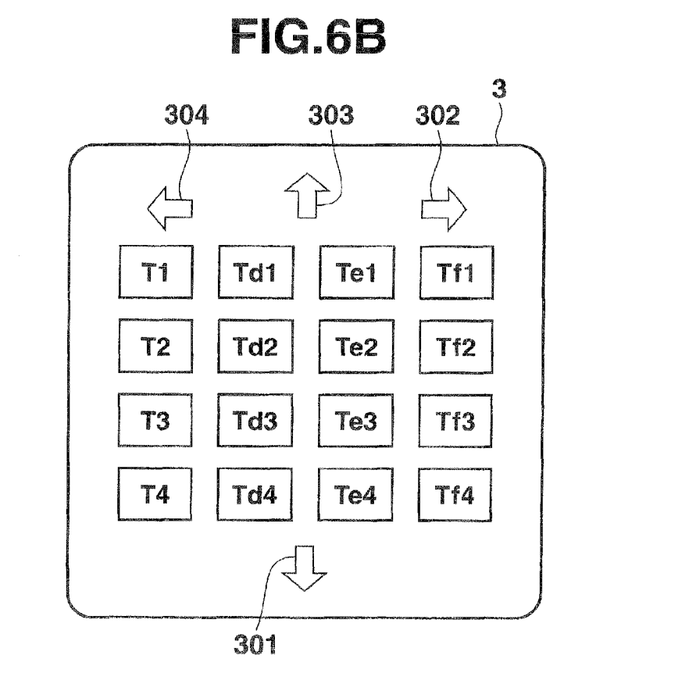

Subsequently, four images in total, i.e., a corresponding thumbnails and three tone-changed thumbnails, are displayed on the liquid crystal display panel 3 in a row direction (step S103). Therefore, when the thumbnails T1 to T4 are read, and the tone changing processing is performed so that a tone of the thumbnails T1 to T4 is changed to a fauvist oil paining, a water color painting, and a gouache painting, the liquid crystal display panel 3 changes a display state as shown in FIG. 6A (the same display state as that in FIG. 5A) to a display state as shown in FIG. 6B, as a result of the processing in step S103.

In other words, in the liquid crystal display panel 3, the original thumbnails T1 to T4 are displayed in a column direction at the left end. In addition, for example, tone-changed thumbnails generated from the thumbnail T1, i.e., a fauvist oil paining thumbnail Td1, a water color painting thumbnail Te1, and a gouache painting thumbnail Tf1, are displayed with respect to the thumbnail T1 in a row direction. The other thumbnails T2, T3, T4 are displayed in the same manner. More specifically, tone-changed thumbnails generated from the thumbnails T2, T3, and T4, i.e., fauvist oil paining thumbnails Td2, Td3, and Td4, water color painting thumbnails Te2, Te3, and Te4, and gouache painting thumbnails Tf2, Tf3, and Tf4, are displayed with respect to the thumbnails T2, T3, and T4 in a row direction.

Therefore, a user can quickly view a desired tone-changed image, and furthermore, the user can easily select which original image is changed to which tone.

When the thumbnail is of a QCIF size (176×144 dots), a user can sufficiently understand the nuance of a tone-changed thumbnail. When the display screen of the image display apparatus 1 is large, e.g., the display screen has 3 rows by 3 columns, thumbnails of QVGA size (320×240 dots) can be displayed on the display screen.

In the above explanation, when a page is turned downward or to the right, the entire screen is completely replaced with a subsequent page. Alternatively, a page display may be shifted downward or to the right line by line. When a page is turned upward or to the left, the previous page is displayed again.

Subsequently, it is determined whether any one of the images is touched or not in the images thus displayed in four rows and four columns (step S106).

Figure 5C:
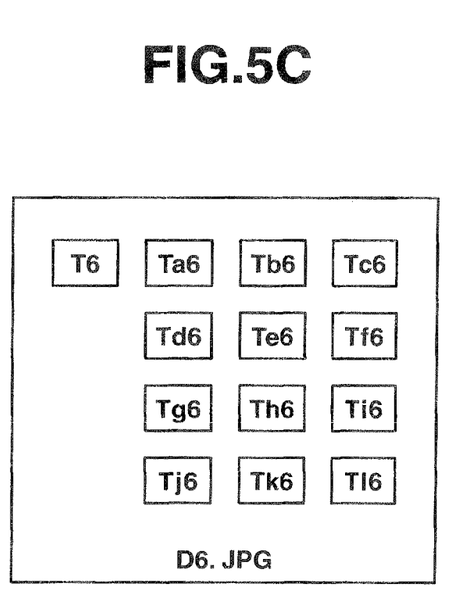

For example, when the thumbnail T6 is touched, image data are generated by generating images by changing a tone of the thumbnail T6 to several kinds of tones (step S107). Therefore, for example, when a user touches the thumbnail T6 in the display state as shown in FIG. 5B, the following thumbnails are generated: (1) an oil painting thumbnail Ta6 obtained by changing a tone of the thumbnail T6 to an oil painting tone, (2) a thick oil thumbnail Tb6 obtained by changing a tone of the thumbnail 16 to a thick oil painting, (3) a gothic oil painting thumbnail Tc6 obtained by changing a tone of the thumbnail 16 to a gothic oil painting, (4) a fauvist oil paining thumbnail Td6 obtained by changing a tone of the thumbnail T6 to a fauvist oil paining, (5) a water color painting thumbnail Te6 obtained by changing a tone of the thumbnail T6 to a water color painting, (6) a gouache painting thumbnail Tf6 obtained by changing a tone of the thumbnail T6 to a gouache painting, (7) a pastel painting thumbnail Tg6 obtained by changing a tone of the thumbnail 16 to a pastel painting, (8) a color pencil sketch thumbnail Th6 obtained by changing a tone of the thumbnail T6 to a color pencil sketch, (9) a pointillism thumbnail Ti6 obtained by changing a tone of the thumbnail 16 to a pointillism, (10) a silkscreen thumbnail Tj6 obtained by changing a tone of the thumbnail T6 to a silkscreen, (11) a drawing thumbnail Tk6 obtained by changing a tone of the thumbnail T6 to drawing. Thus, image data D6 are generated as shown in FIG. 5C.

Further, the CPU 11 processes the generated image data 36 according to JPEG method, and compresses the image data D6 (step S108). Therefore, JPEG image data D6.JPG is generated from the image data D6 as a result of processing in step S108. Then, the generated JPEG image data are saved to the folder 18B of the memory card 18 (step S109). Therefore, JPEG image data D6.JPG is stored to the folder 18B of the memory card 18 as shown in FIG. 32 as a result of processing in step S109.

The image data D6.JPG stored in the folder 18B is JPEG image data. Accordingly, when the memory card 18 is detached from the image display apparatus 1, and the memory card 18 is attached to the image display clock 10, another DPF, or the like, they can reproduce and display the thumbnail T6 and several kinds of conversion images obtained by changing a tone of the thumbnail T6 to several kinds of tones. Therefore, the advantageous effect of quickly viewing a tone-changed image of a desired tone in the image display apparatus 1 can also be provided by other apparatuses such as the image display clock 10.

When the image data D6.JPG is stored, image data D6.JPG serving as a still picture file having a header is stored, and the header preferably includes a conversion date/time and the type of the tone of the tone-changed image.

In the present embodiment, one thumbnail and eight kinds of tone-changed thumbnails are stored in one still picture file. However, various changes can also be made. For example, one row in a row direction, one column in a column direction, or the entire screen displayed may be recorded as one still image file.

Figure 6C:
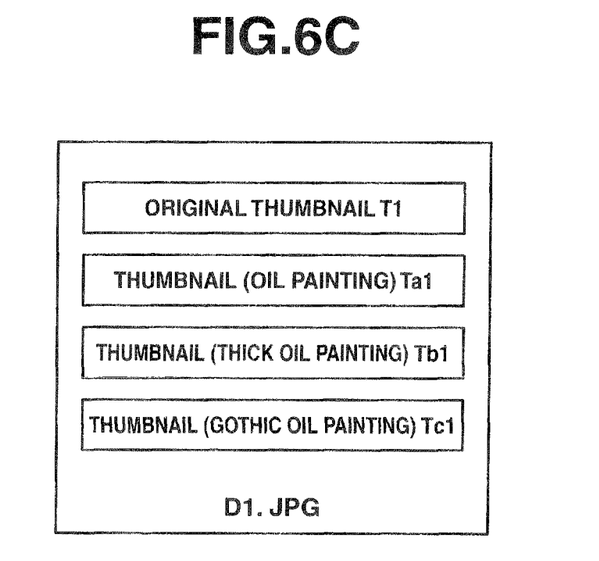

For example, when the thumbnail T1 is touched in the state of FIG. 6A, the following thumbnails are generated as shown in FIG. 6C: the thumbnail T1 belonging to the line in question, the oil painting thumbnail Ta1 obtained by changing a tone of the thumbnail T1 to an oil painting, the thick oil painting thumbnail Tb1 obtained by changing a tone of the thumbnail T1 to a thick oil painting, and the gothic oil painting thumbnail Tc1 obtained by changing a tone of the thumbnail T1 to a gothic oil painting. Thus, image data D1 are generated.

Then, like the above processing, the CPU 11 processes the generated image data D1 according to JPEG method, and compresses the image data D1 (step S108). Therefore, JPEG image data D1.JPG is generated from the image data D6 as a result of processing in step S108. Then, the generated JPEG image data is saved to the folder 18B of the memory card 18 (step S109). Therefore, JPEG image data D1.JPG is stored to the folder 18B of the memory card 18 as shown in FIG. 3B as a result of processing in step S109.

It should be noted that the image data D6 and the image data D1 displayed on the image display apparatus are made of only one JPEG image, which merely allows a user to quickly understand the overall atmosphere and does not allow the user to select one of reduced images therein.

Oh the other hand, when a user does not touch an original thumbnail but touches a tone-changed thumbnail, the result of the determination made in step S106 is "NO", and the result of the determination made in step S110 is "YES". Accordingly, the CPU 11 proceeds from step S110 to step S111, in which tone changing processing is performed so that a tone of an original image corresponding to the thumbnail corresponding to the touched tone-changed thumbnail is changed to a tone of the tone-changed thumbnail, and the converted painting image is displayed.

In other words, when a user touches an oil painting thumbnail Ta6 in the state of FIG. 5B, the original thumbnail corresponding to the oil painting thumbnail Ta6 is the thumbnail T6, and the original image corresponding to the thumbnail T6 is an original image I6. Accordingly, image data Ia6 is generated by converting the original image I6 to an oil painting, and the converted painting image is displayed based on the image data Ia6. Subsequently, like the above processing, JPEG processing is applied to the image data obtained by changing a tone of the original image to the painting (step S108), and the tone-changed original image is saved to the folder 18B.

Therefore, the thumbnail is converted to a tone-changed thumbnail as described above, and a user can quickly see how the tone is changed based on the tone-changed thumbnail in the image display apparatus 1, and furthermore, after the user sees the tone-changed thumbnail, a tone of the original image corresponding to the tone-changed thumbnail having the tone preferred by the user is changed. This allows the user to view and save the converted original image.

According to the embodiment, since the shape of the main body of the digital photo frame is in a shape similar to a desk clock, the digital photo frame can also be used as a clock capable of displaying images.

In general, the digital photo frame can use a memory card such as an SD card. Therefore, when a clock is also provided with a memory card slot, the clock can display recorded image data and can display recorded image data as a background of the time indication.

Since the digital photo frame can record and reproduce data by using a memory card, an image generated in a special display format can be reproduced by another image display apparatus.

In the above embodiment, all the data for the entire one screen is replaced in response to page turning operation. Alternatively, each row or each column may be replaced or scrolled, and such operation is within the scope of the same technical idea.

Even when the row direction is adopted as the column direction and the column direction is adopted as the row direction in the above embodiment, such configuration is also within the scope of the same technical idea.

In the above embodiment, the respective image files F1, F2, F3, ... include image data (original images I1, I2, I3, ...) of original images, i.e., images obtained by taking pictures, and image data of thumbnails (thumbnails T1, T2, T3, ...), i.e., reduced images of the original image data. However, when only the image data (original images I1, I2, I3, ...), i.e., images obtained by taking pictures, are recorded in the memory 18, original images may be read from the four files in the processing of step S101, and thumbnails may be generated from the read original images.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means. In the above embodiment, the present invention is applied to the digital photo frame. However, the present invention is not limited to the digital photo frame. For example, the present invention may also be applied to various kinds of computers and electronic devices such as a PDA, a portable telephone, a digital camera, and a printer.

What is claimed is:

1. An image display apparatus comprising:
a storage unit configured to store a plurality of pieces of image data representing original images;
a display screen configured to display reduced images, which are reduced in size from the original images;
a processor configured to change the original images or the reduced images to tone-changed images or tone-changed reduced images having a plurality of tones; and
a display controller configured to control the display screen to display a plurality of reduced images and tone-changed reduced images of different kinds obtained from the reduced images in a column direction and a row direction, such that the reduced images are arranged and displayed in the column direction, and the tone-changed reduced images of different kinds obtained from the reduced images arranged and displayed in the column direction, are arranged and displayed in the row direction;
wherein:
if a scroll in the column direction is instructed, the display controller is configured to arrange and display new reduced images in the column direction, and to arrange and display tone-changed reduced images of said different kinds, obtained from the new reduced images arranged and displayed in the column direction, in the row direction;
if a scroll in the row direction is instructed, the display controller is configured to arrange and display tone-changed reduced images of other kinds obtained from the reduced images, while simultaneously maintaining display of the reduced images already displayed in the column direction; and
the column direction corresponds to one of a vertical direction and a horizontal direction of the display screen, and the row direction corresponds to the other one of the vertical direction and the horizontal direction of the display screen.

2. An image display apparatus comprising:
a storage unit configured to store a plurality of pieces of image data representing original images;
a display screen configured to display reduced images, which are reduced in size from the original images;
a processor configured to change the original images or the reduced images to tone-changed images or tone-changed reduced images having a plurality of tones; and
a display controller configured to control the display screen to display a plurality of reduced images and tone-changed reduced images of different kinds obtained from the reduced images in a column direction and a row direction, such that the reduced images are arranged and displayed in the column direction, and the tone-changed reduced images of different kinds obtained from the reduced images arranged and displayed in the column direction, are arranged and displayed in the row direction;
wherein:

if a page-turn in the column direction is instructed, the display controller is configured to arrange and display reduced images of a next new page in the column direction, and to arrange and display tone-changed reduced images of said different kinds, obtained from the new reduced images arranged and displayed in the column direction, in the row direction;

if a page-turn in the row direction is instructed, the display controller is configured to arrange and display tone-changed reduced images of other kinds obtained from the reduced images, while simultaneously maintaining display of the reduced images already displayed in the column direction; and the column direction corresponds to one of a vertical direction and a horizontal direction of the display screen, and the row direction corresponds to the other one of the vertical direction and the horizontal direction of the display screen.

3. An image display method for an image display apparatus comprising a storage unit configured to store a plurality of pieces of image data representing original images, the method comprising:

displaying on a display screen reduced images, which are reduced in size from the original images;

changing the original images or the reduced images to tone-changed images or tone-changed reduced images having a plurality of tones; and controlling the display screen to display a plurality of reduced images and tone-changed reduced images of different kinds obtained from the reduced images in a column direction and a row direction, such that the reduced images are arranged and displayed in the column direction, and the tone-changed reduced images of different kinds obtained from the reduced images arranged and displayed in the column direction, are arranged and displayed in the row direction, wherein the controlling further comprises:
if a scroll in the column direction is instructed, arranging and displaying new reduced images in the column direction, and arranging and displaying tone-changed reduced images of said different kinds, obtained from the new reduced images arranged and displayed in the column direction, in the row direction; and if a scroll in the row direction is instructed, arranging and displaying tone-changed reduced images of other kinds obtained from the reduced images, while simultaneously maintaining display of the reduced images already displayed in the column direction; and wherein the column direction corresponds to one of a vertical direction and a horizontal direction of the display screen, and the row direction corresponds to the other one of the vertical direction and the horizontal direction of the display screen.

4. An image display method for an image display apparatus comprising a storage unit configured to store a plurality of pieces of image data representing original images, the method comprising:

displaying on a display screen reduced images, which are reduced in size from the original images;

changing the original images or the reduced images to tone-changed images or tone-changed reduced images having a plurality of tones; and controlling the display screen to display a plurality of reduced images and tone-changed reduced images of different kinds obtained from the reduced images in a column direction and a row direction, such that the reduced images are arranged and displayed in the column direction, and the tone-changed reduced images of different kinds obtained from the reduced images arranged and displayed in the column direction, are arranged and displayed in the row direction, wherein the controlling further comprises:
if a page-turn in the column direction is instructed, arranging and displaying reduced images of a next new page in the column direction, and further arranging and displaying tone-changed reduced images of said different kinds, obtained from the new reduced images arranged and displayed in the column direction, in the row direction; and if a page-turn in the row direction is instructed, arranging and displaying tone-changed reduced images of other kinds obtained from the reduced images, while simultaneously maintaining display of the reduced images already displayed in the column direction; and wherein the column direction corresponds to one of a vertical direction and a horizontal direction of the display screen, and the row direction corresponds to the other one of the vertical direction and the horizontal direction of the display screen.

5. A non-transitory computer readable storage medium having stored thereon a computer program which is executable by a computer of an image display apparatus, the image display apparatus comprising a storage unit configured to store a plurality of pieces of image data representing original images, the computer program being executable by the computer to perform functions comprising:

displaying on a display screen reduced images, which are reduced in size from the original images;

changing the original images or the reduced images to tone-changed images or tone-changed reduced images having a plurality of tones; and controlling the display screen to display a plurality of reduced images and tone-changed reduced images of different kinds obtained from the reduced images in a column direction and a row direction, such that the reduced images are arranged and displayed in the column direction, and the tone-changed reduced images of different kinds obtained from the reduced images arranged and displayed in the column direction, are arranged and displayed in the row direction, wherein the controlling further comprises:
if a scroll in the column direction is instructed, arranging and displaying new reduced images in the column direction, and arranging and displaying tone-changed reduced images of said different kinds, obtained from the new reduced images arranged and displayed in the column direction, in the row direction; and if a scroll in the row direction is instructed, arranging and displaying tone-changed reduced images of other kinds obtained from the reduced images, while simultaneously maintaining display of the reduced images already displayed in the column direction; and wherein the column direction corresponds to one of a vertical direction and a horizontal direction of the display screen, and the row direction corresponds to the other one of the vertical direction and the horizontal direction of the display screen.

6. A non-transitory computer readable storage medium having stored thereon a computer program which is executable by a computer of an image display apparatus, the image display apparatus comprising a storage unit configured to store a plurality of pieces of image data representing original images, the computer program being executable by the computer to perform functions comprising:

displaying on a display screen reduced images, which are reduced in size from the original images;

changing the original images or the reduced images to tone-changed images or tone-changed reduced images having a plurality of tones; and controlling the display screen to display a plurality of reduced images and tone-changed reduced images of different kinds obtained from the reduced images in a column direction and a row direction, such that the reduced images are arranged and displayed in the column direction, and the tone-changed reduced images of different kinds obtained from the reduced images arranged and displayed in the column direction, are arranged and displayed in the row direction, wherein the controlling further comprises:

if a page-turn in the column direction is instructed, arranging and displaying reduced images of a next new page in the column direction, and further arranging and displaying tone-changed reduced images of said different kinds, obtained from the new reduced images arranged and displayed in the column direction, in the row direction; and if a page-turn in the row direction is instructed, arranging and displaying tone-changed reduced images of other kinds obtained from the reduced images, while simultaneously maintaining display of the reduced images already displayed in the column direction; and wherein the column direction corresponds to one of a vertical direction and a horizontal direction of the display screen, and the row direction corresponds to the other one of the vertical direction and the horizontal direction of the display screen.

\* \* \* \* \*